United States Patent
Okada et al.

(10) Patent No.: US 12,196,410 B2
(45) Date of Patent: Jan. 14, 2025

(54) LIGHTING DEVICE

(71) Applicant: Japan Display Inc., Tokyo (JP)

(72) Inventors: Masafumi Okada, Tokyo (JP); Makoto Hasegawa, Tokyo (JP); Nobuyuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/244,545

(22) Filed: Sep. 11, 2023

(65) Prior Publication Data

US 2023/0417392 A1  Dec. 28, 2023

Related U.S. Application Data

(63) Continuation of application No. PCT/JP2022/000194, filed on Jan. 6, 2022.

(30) Foreign Application Priority Data

Mar. 11, 2021  (JP) ................................ 2021-039071

(51) Int. Cl.
*F21V 5/02* (2006.01)
*F21V 7/00* (2006.01)
(Continued)

(52) U.S. Cl.
CPC ................ *F21V 5/02* (2013.01); *F21V 7/005* (2013.01); *G02B 6/0053* (2013.01); *F21V 2200/20* (2015.01); *F21Y 2115/10* (2016.08)

(58) Field of Classification Search
CPC .......... F21V 5/02; F21V 7/005; G02B 6/0053
See application file for complete search history.

(56) References Cited

U.S. PATENT DOCUMENTS

2007/0064294 A1  3/2007  Hoshino et al.
2009/0129056 A1  5/2009  Taya et al.
(Continued)

FOREIGN PATENT DOCUMENTS

JP  2000348515 A  * 12/2000
JP  2009158468 A    7/2009
(Continued)

OTHER PUBLICATIONS

Japanese Office Action issued Jan. 30, 2024 in corresponding Japanese Application No. 2023-505142.
(Continued)

*Primary Examiner* — Evan P Dzierzynski
*Assistant Examiner* — Nathaniel J Lee
(74) *Attorney, Agent, or Firm* — K&L Gates LLP

(57) ABSTRACT

Disclosed is a lighting device including a light guide plate, a plurality of LEDs, a prism sheet disposed on a side toward the upper surface of the light guide plate, and a reflective sheet disposed on a side toward the lower surface of the light guide plate. The plurality of LEDs are arrayed on a side surface corresponding to a first side of the light guide plate in a first direction along the first side. The prism sheet includes a first prism array that is formed on a surface facing the light guide plate. The first prism array includes prisms that are extended in the first direction and arrayed in a second direction perpendicular to the first direction. The upper surface of the light guide plate and the prism sheet sandwich a diffusion sheet therebetween. The diffusion sheet has a haze value between 30% and 65% when measured in compliance with JIS K7361. The prisms on the first prism array have an apex angle between 55 degrees and 66 degrees.

14 Claims, 21 Drawing Sheets

(51) Int. Cl.
*F21V 8/00* (2006.01)
*F21Y 115/10* (2016.01)

(56) References Cited

U.S. PATENT DOCUMENTS

| | | |
|---|---|---|
| 2010/0328579 A1 | 12/2010 | Shim et al. |
| 2014/0028924 A1 | 1/2014 | Yamaguchi et al. |
| 2016/0259115 A1* | 9/2016 | Kitano ................ G02B 5/0242 |

FOREIGN PATENT DOCUMENTS

| | | |
|---|---|---|
| JP | 2010526333 A | 7/2010 |
| JP | 2012069409 A | 4/2012 |
| WO | 2004104658 A1 | 12/2004 |
| WO | 2012099127 A1 | 6/2014 |

OTHER PUBLICATIONS

International Search Report from corresponding PCT application PCT/JP2022/000194, dated Feb. 22, 2022.

\* cited by examiner

FIG.3
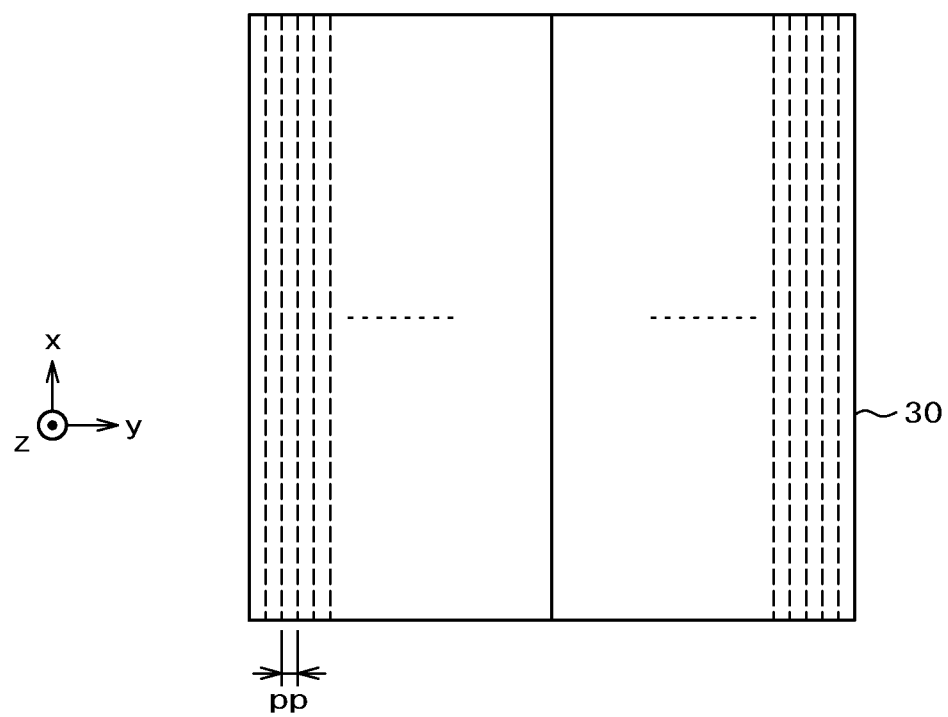
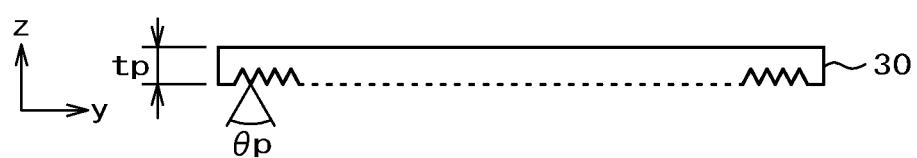
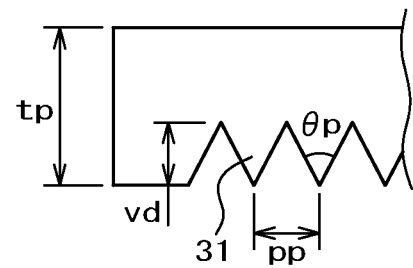

F I G . 9
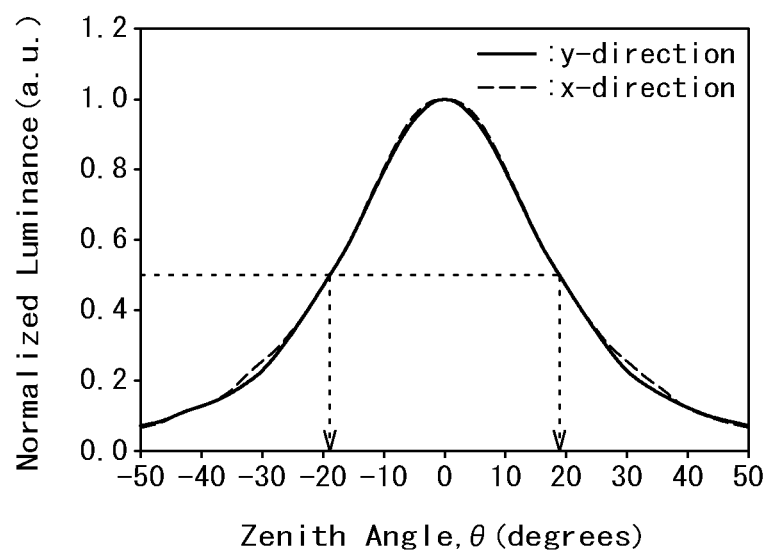

F I G . 1 1
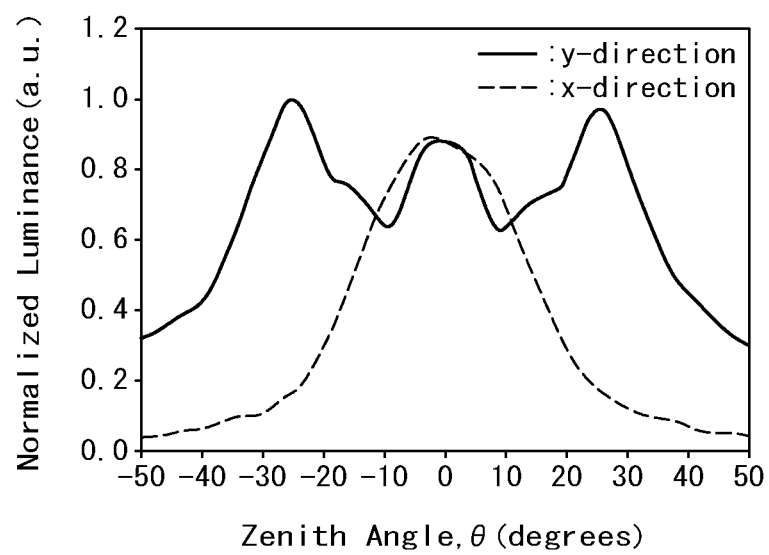

F I G . 1 3
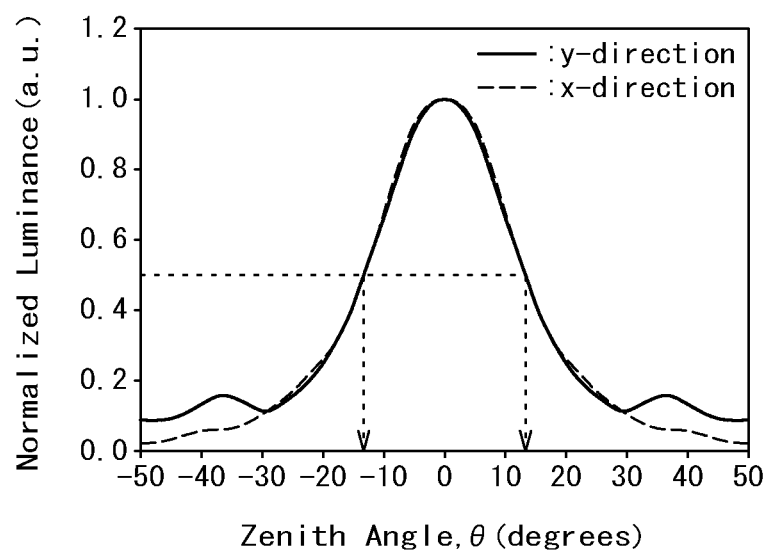

F I G . 1 6
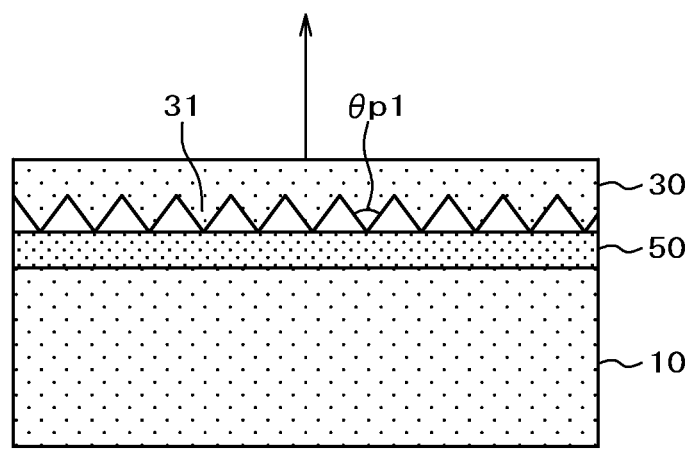

F I G. 17
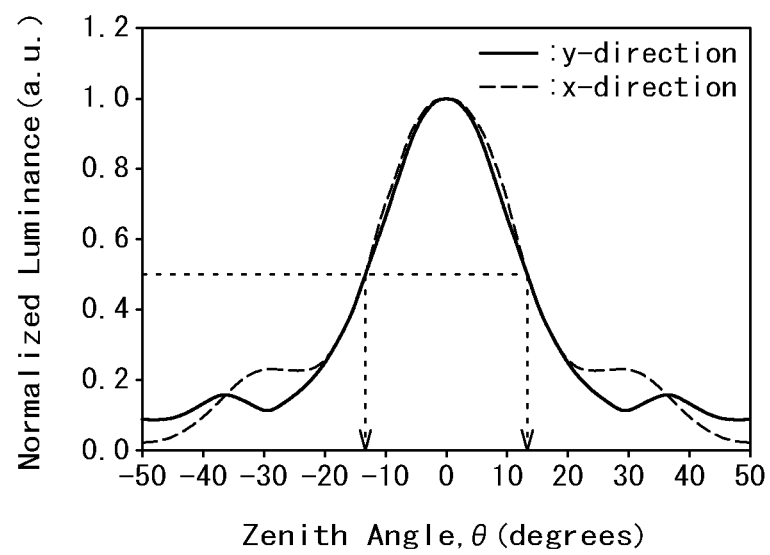

LIGHTING DEVICE

CLAIM OF PRIORITY

The present application is a continuation application of International application No. PCT/JP2022/000194 filed on Jan. 6, 2022, which claims priority to Japanese Patent Application No. 2021-039071 filed on Mar. 11, 2021. The contents of these applications are incorporated herein by reference in their entirety.

BACKGROUND OF THE INVENTION

1. Field of the Invention

The present invention relates to a lighting device that is thin and has a narrow light distribution angle.

2. Description of the Related Art

It is demanded that collimated light be projected onto each seat of an airplane or train. It is also demanded that such collimated light be realized by a small and thin lighting device. Meanwhile, in a case where the light to be emitted from the lighting device is to be shaped or the direction of the light emitted from the lighting device is to be changed, for example, a lens, a liquid crystal lens, or other refraction means may be disposed on a light-emitting surface of the lighting device to change the angle of the emitted light. In such cases, too, the light can be accurately controlled as long as the light emitted from the lighting device is uniform and collimated.

Described in Japanese Patent Laid-open No. 2012-69409 is a configuration in which a lens or reflector for changing the light distribution angle is disposed on a direct light source, and refraction means for changing the direction of light is disposed on the above-mentioned lens or reflector. Japanese Patent Laid-open No. 2012-69409 states that, for example, a lens, a prism, a liquid lens, or a liquid crystal lens is used as the refraction means.

Described in International Publication No. WO 2012/099127 A is a configuration in which a liquid crystal lens is used for various optical devices as the means for shaping the emitted light or changing the direction of the emitted light.

SUMMARY OF THE INVENTION

In a case, for example, where the lighting device is to be used as a spotlight, a lighting device emitting highly directional light, that is, a lighting device having a narrow light distribution angle, is demanded. Such a lighting device has been configured so as to form parallel light by using a parabolic mirror. However, the light source of such a lighting device needs to have sufficient depth, and cannot easily be reduced in size or thickness.

Meanwhile, in a case where a thin lighting device is used, it is difficult to narrow the light distribution angle. For such a thin lighting device, a method for controlling the direction of light is available. This method is exercised with a light emitting diode (LED) acting as a light source disposed on a side surface of a light guide plate and with a prism sheet disposed on the main surface of the light guide plate. However, this method is problematic in that irradiation light is glary as light is totally reflected from a prism. Further, this method is also problematic in that any foreign substance existing, for example, on the main surface of the light guide plate is easily noticeable as a defect.

The present invention has been made in view of the above circumstances, and provides a lighting device that is thin, has a narrow light distribution angle, and emits non-glare light without exhibiting an easily noticeable defect.

The present invention has been made to provide the lighting device described above. Main specific features of the lighting device are as described below.

(1) There is provided a lighting device including a light guide plate, a plurality of light emitting diodes, a prism sheet, and a reflective sheet. The prism sheet is disposed on a side toward an upper surface of the light guide plate. The reflective sheet is disposed on a side toward a lower surface of the light guide plate. The plurality of light emitting diodes are arrayed on a side surface corresponding to a first side of the light guide plate in a first direction along the first side. A first prism array of the prism sheet is formed on a surface facing the light guide plate. Prisms on the first prism array are extended in the first direction, and arrayed in a second direction perpendicular to the first direction. A diffusion sheet exists between the upper surface of the light guide plate and the prism sheet. A haze value of the diffusion sheet is between 30% and 65% when measured in compliance with JIS K7361. The apex angle of the prisms on the first prism array is between 55 degrees and 66 degrees.

(2) The lighting device as described in (1) above is configured such that a direction of a chief ray of light emitted from the upper surface of the light guide plate is tilted with respect to a normal of the upper surface of the light guide plate.

(3) The lighting device as described in (2) above is configured such that an angle between a direction of a chief ray of light emitted from the prism sheet and a normal direction of the prism sheet is smaller than the angle between the direction of the chief ray of light emitted from the upper surface of the light guide plate and the normal of the upper surface of the light guide plate.

(4) The lighting device as described in (2) above is configured such that a direction of a chief ray of light emitted from the prism sheet is a normal direction of the prism sheet.

BRIEF DESCRIPTION OF THE DRAWINGS

FIG. 3 contains a plan view and cross-sectional view of a prism sheet;

FIG. 9 is a graph illustrating an example of the light distribution angle property of a configuration depicted in FIG. 8;

FIG. 11 is a graph illustrating an example of the light distribution angle property of a configuration depicted in FIG. 10;

FIG. 13 is a graph illustrating an example of the light distribution angle property of the configuration depicted in FIG. 12;

FIG. 16 is a cross-sectional view illustrating the direction of light emitted from the prism sheet according to the first embodiment;

FIG. 17 is a graph illustrating an example of the light distribution angle property of a configuration depicted in FIG. 16;

DETAILED DESCRIPTION OF THE PREFERRED EMBODIMENTS

The present invention will now be described in detail in terms of embodiments.

First Embodiment

Figure 1:
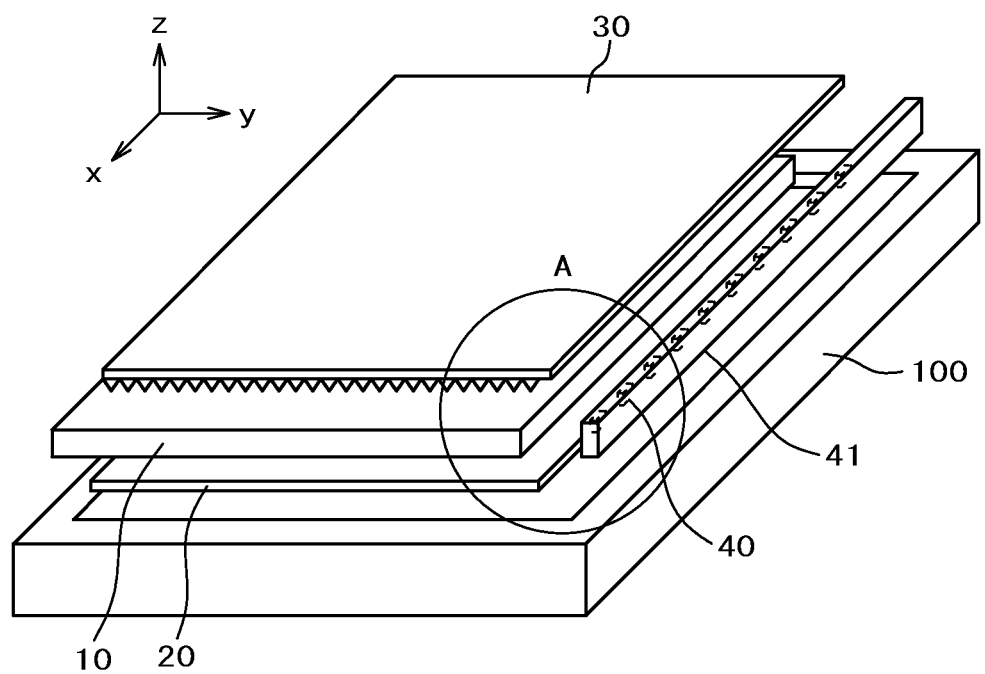
FIG. 1 is an exploded perspective view of a lighting device according to a first comparative example.

FIG. 1 is an exploded perspective view illustrating a basic configuration of a thin lighting device. In this document, the configuration depicted in FIG. 1 may be referred to as a first comparative example. Depicted in FIG. 1 is the configuration of a so-called side lighting device including LEDs 40 that are disposed on a side surface of a light guide plate 10. This type of lighting device can be made thin.

Referring to FIG. 1, the LEDs 40 are disposed on the side surface of the light guide plate 10 at equally spaced intervals. The LEDs 40 are mounted on an LED substrate 41. A reflective sheet 20 is disposed on the lower surface of the light guide plate 10. The reflective sheet 20 reflects light, which travels downward from the light guide plate 10, upward toward a light-emitting surface. For example, 3M's enhanced specular reflector (ESR) may be used as the reflective sheet 20. The thickness of the reflective sheet 20 is approximately 70 μm, for example.

Referring to FIG. 1, the light guide plate 10 is disposed on the reflective sheet 20. The thickness of the light guide plate 10 is approximately 2 mm. The light guide plate 10 plays a role of guiding the light from the LEDs 40, which is incident from the side surface, upward toward the light-emitting surface. The light traveling toward the lower surface of the light guide plate 10 is reflected upward toward the light-emitting surface by the reflective sheet 20.

A prism array is formed on the upper and lower surfaces of the light guide plate 10 so that the light incident from the side surface is efficiently emitted from a main surface to provide a planar light source. The prism array formed on the upper and lower surfaces of the light guide plate 10 is quite different from the prism array formed on a prism sheet 30.

The prism array formed on the upper or lower surface of the light guide plate 10 defines the angle of light emission from the light guide plate 10. For example, the light guide plate 10, the LEDs 40, the reflective sheet 20, and the prism sheet 30 are housed in an outer frame 100.

Figure 2:
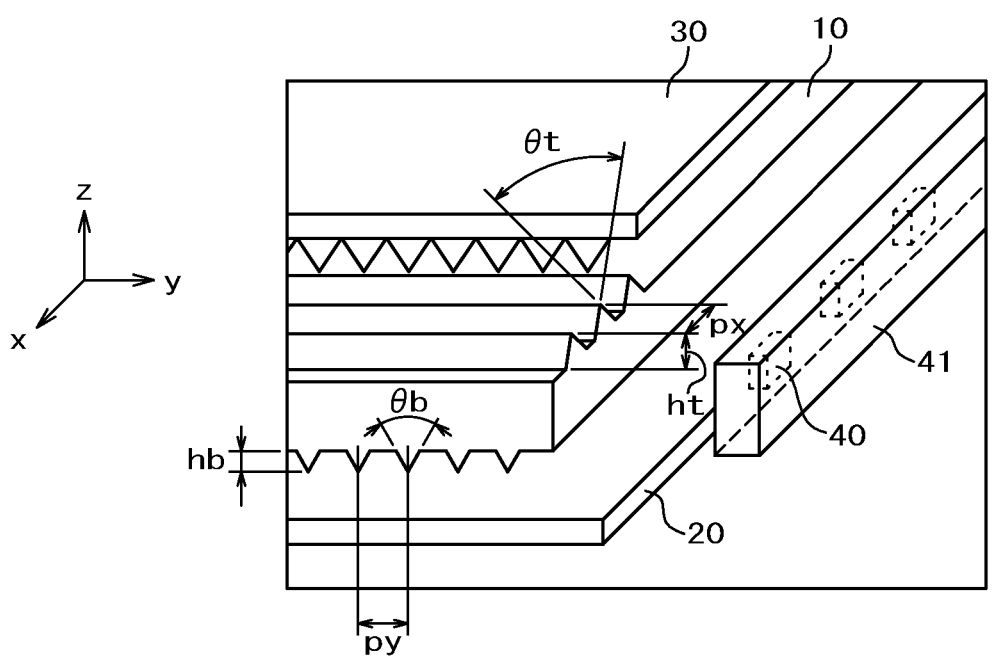
FIG. 2 is a detailed view of part A of FIG. 1.

FIG. 2 is a detailed perspective view of region A, which is circled in FIG. 1. The outer frame 100 is omitted from FIG. 2. The prism array is formed on the upper and lower surfaces of the light guide plate 10 so that the light incident from the side surface is efficiently emitted from the main surface to provide the planar light source. The prism array formed on the upper and lower surfaces of the light guide plate 10 is quite different from the prism array formed on the prism sheet 30.

The prism array extended in the y-direction is formed on the upper surface of the light guide plate 10. Protrusions of this prism array are extended in the y-direction and arrayed in the x-direction. The height ht of the protrusions is, for example, 0.05 mm, and the pitch px is, for example, 0.1 mm. A prism apex angle θt is, for example, 90 degrees.

The prism array on the lower surface of the light guide plate 10 is extended in the x-direction and arrayed in the y-direction. The height hb of the protrusions of the prism array on the lower surface of the light guide plate 10 is, for example, 0.0043 mm, and the pitch py is, for example, 0.1 mm. The prism apex angle θb is, for example, 170 degrees. It should be noted that the prism array on the upper and lower surfaces of the light guide plate 10 may alternatively be formed by making V-grooves in the surfaces of the light guide plate 10 instead of by making the protrusions on the surfaces of the light guide plate 10.

FIG. 3 is a diagram illustrating the prism sheet 30 in a case where the prism array is formed on the prism sheet 30 by making the V-grooves. The prism sheet 30 depicted in FIG. 3 is a so-called reverse prism sheet with prism array protrusions oriented downward. Referring to FIG. 3, the prism array is extended in the x-direction and arrayed in the y-direction. Examples of the dimensions of the prism sheet 30 are as described below. For example, the prism sheet 30 has a thickness tp of 0.125 mm, a V-groove depth Vd of 0.075 mm, an apex angle θp of 68 degrees, and a pitch pp of 0.1 mm. The prism sheet 30 depicted in FIG. 9 generally functions so that light trying to spread in the y-direction is collected in a direction toward the light-emitting surface, that is, in the z-direction.

In the present invention, however, the prism sheet 30 functions so that the light emitted from the light guide plate 10 at a certain angle with respect to the main surface of the light guide plate 10 is oriented in the normal direction of the prism sheet 30. Therefore, for example, the pitch, height, and apex angle of prisms 31 formed on the prism sheet 30 are varied according to the angle of light emission from the light guide plate 10.

Figure 4:
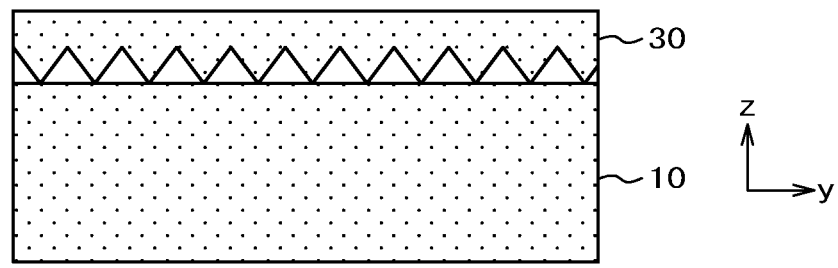
FIG. 4 is a cross-sectional view of the prism sheet disposed on a light guide plate.

FIG. 4 is a cross-sectional view illustrating only the light guide plate 10 and the prism sheet 30 from the configuration depicted in FIG. 1. The prism sheet 30 with the prism array formed on the lower surface thereof is disposed on the light guide plate 10. The prism sheet 30 functions so that the light emitted from the light guide plate 10 at a predetermined distribution angle in a predetermined direction is oriented in the normal direction of the light guide plate 10 or prism sheet 30. It should be noted that the prism array described with reference to FIG. 2 is formed on the upper and lower surfaces of the light guide plate 10. However, such a prism array is omitted from FIG. 4.

Figure 5:
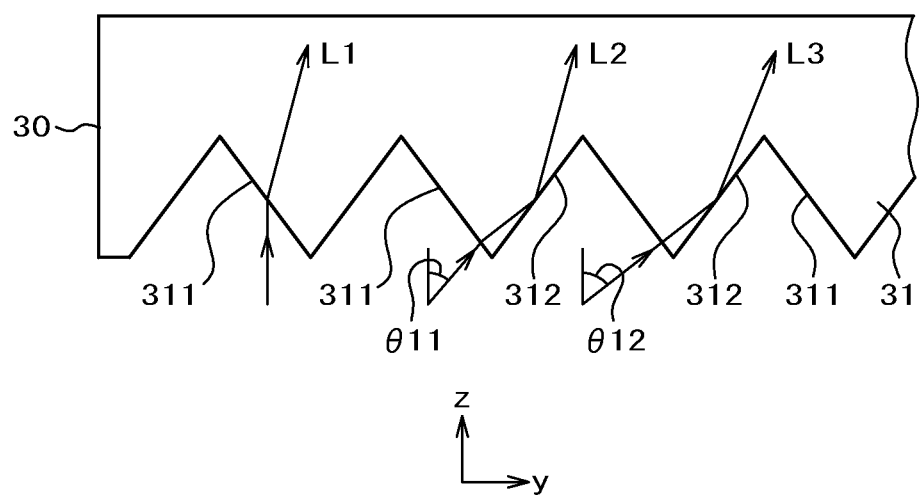
FIG. 5 is a cross-sectional view illustrating the behavior of light incident on the prism sheet.

FIG. 5 is a cross-sectional view illustrating a prism array operation on the prism sheet 30. Light is emitted from the light guide plate 10 at a predetermined angle with respect to the main surface of the light guide plate 10. The prism array operation varies with the angle of light emission from the light guide plate 10. Referring to FIG. 5, light L1 represents light that is emitted in the normal direction of the main surface of the light guide plate 10. The light L1 is refracted at a first surface 311 of the prisms 31 and then emitted from the prism sheet 30.

Light L2 represents light that is emitted at an angle θ11 with respect to the normal direction of the main surface of the light guide plate 10. The light L2 is refracted at the first surface 311 of the prisms 31, incident, then totally reflected from a second surface 312, and emitted from the prism sheet 30.

Light L3 represents light that is emitted at an angle θ12 with respect to the normal direction of the main surface of the light guide plate 10. The light L3 is almost vertically incident on the first surface 311. Therefore, the light L3 is totally reflected from the second surface 312 without being substantially refracted at the first surface 311, and emitted from the prism sheet 30.

As depicted in FIG. 5, the ratio of total light reflection from the second surface 312 of the prisms 31 increases with an increase in the angle at which the light from the light guide plate 10 is emitted with respect to the normal direction of the main surface of the light guide plate 10. The glare of irradiation light increases with an increase in the ratio of total light reflection.

Figure 6:
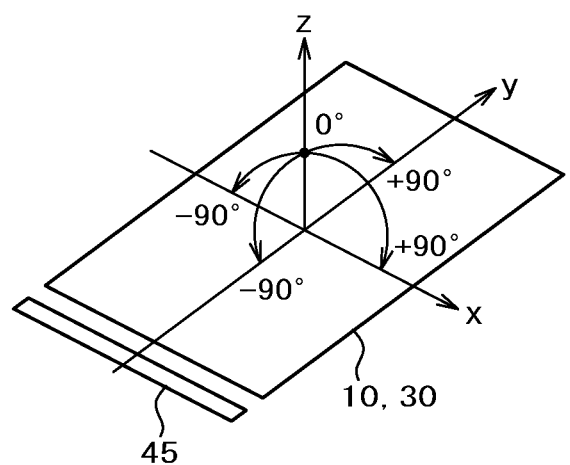
FIG. 6 is a diagram defining a polar angle.

Referring to FIG. 4, the light is emitted from the light guide plate 10 at the predetermined angle with respect to the main surface of the light guide plate 10. The predetermined angle is defined by the prism array that is formed on the lower and upper (main) surfaces of the light guide plate 10. Subsequently, the light emitted from the light guide plate 10 is redirected by the prism sheet 30 and emitted in the normal direction of the prism sheet 30 or light guide plate 10. Referring to FIG. 6, disposed is a light source 45 including LEDs that are arrayed in the x-direction along one side of the light guide plate 10.

Light has a distribution even when it is directed in a predetermined direction. This property is referred to as the light distribution angle property. FIG. 6 defines a polar angle. Referring to FIG. 6, the polar angle is defined as the angle with respect to the normal direction of the light guide plate 10 or prism sheet 30.

Figure 7:
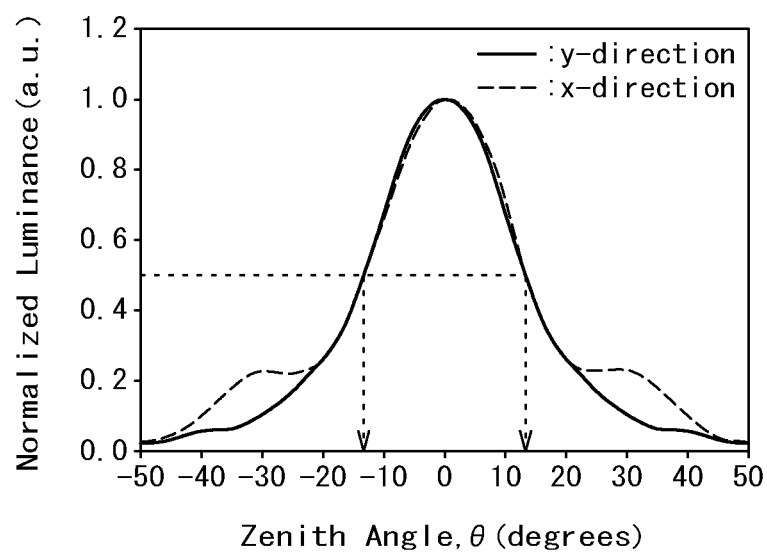
FIG. 7 is a graph illustrating an example of a light distribution angle property of a configuration depicted in FIG. 4.

FIG. 7 illustrates the light distribution angle property of a configuration depicted in FIG. 4. The horizontal axis of FIG. 7 represents the polar angle (degrees), which is defined in FIG. 6. Referring to FIG. 7, the x- and y-directions have substantially the same property when the polar angle is 20 degrees or smaller. However, when the polar angle is greater than 20 degrees, the x- and y-directions differ in the light distribution angle property.

The light distribution angle property indicates the degree of light collimation. The degree of light collimation is evaluated on the basis of the full width at half maximum of the light distribution angle property. More specifically, it can be said that the degree of light collimation increases with a decrease in the full width at half maximum. Referring to FIG. 7, the full width at half maximum is indicated by portions marked by dotted lines. The full width at half maximum of the light distribution angle property is approximately 26 degrees and does not substantially differ between the x-direction and the y-direction.

The light emitted from a light source device has a distribution as depicted in FIG. 7. However, referring to FIG. 7, the intensity of light is high when the polar angle is zero. An emitted light ray directed to have the highest intensity is hereinafter referred to as the chief ray. That is to say, referring to FIG. 7, the chief ray is directed in the normal direction of the main surface of the prism sheet 30 or light guide plate 10. However, the direction of the chief ray of the light emitted, for example, from the lighting device or the parts of the lighting device, such as the light guide plate 10 and the prism sheet 30, is set not only at a polar angle of zero but also at various other polar angles as needed.

Incidentally, the configuration depicted in FIG. 4 has the following problems. As described with reference, for example, to FIG. 5, when light is directed in the normal direction of the prism sheet 30 by using the total reflection function of the prism array on the prism sheet 30, there arises a problem where, for example, the irradiation light glares or bright lines appear in the vicinity of the light source. That is to say, nonuniformly irradiation light easily becomes conspicuous. Another problem with the configuration depicted in FIG. 4 is that any foreign substance existing on the light guide plate 10 or the prism sheet 30 appears as a defect on an irradiated surface.

Figure 8:
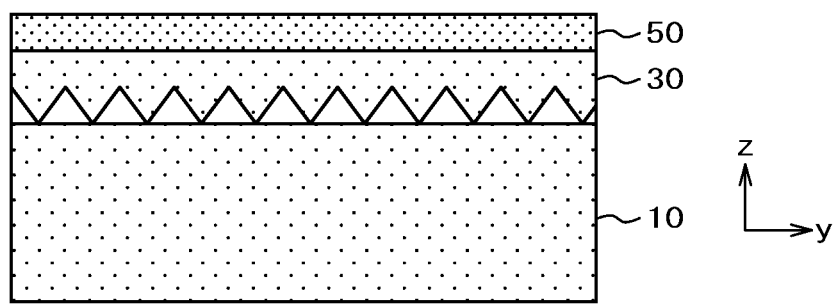
FIG. 8 is a cross-sectional view of a diffusion sheet disposed on the prism sheet.

It is conceivable that a diffusion sheet 50 may be disposed on the prism sheet 30 as depicted in FIG. 8 in order to address the above-mentioned problems. The diffusion sheet 50 acts to diffuse incident light, and thus suppresses the glare of the irradiation light. Additionally, the diffusion sheet 50 is able to alleviate the impact that is exerted on the irradiation light, for example, by a foreign substance existing on the prism sheet 30 or the light guide plate 10.

However, when the diffusion sheet 50 is disposed on the prism sheet 30, a problem occurs with the light distribution angle property. FIG. 9 illustrates the light distribution angle property of a configuration depicted in FIG. 8. Using the diffusion sheet 50 makes the light distribution angle property depicted in FIG. 9 almost uniform in both the x- and y-directions, and provides a smooth distribution like a normal distribution.

However, the configuration depicted in FIG. 8 does not provide sufficiently collimated light. As depicted in FIG. 9, the full width at half maximum of the light distribution angle property is 38 degrees, and significantly greater than depicted in FIG. 7. That is to say, the configuration depicted in FIG. 8 will not easily obtain a sharp spot.

Figure 10:
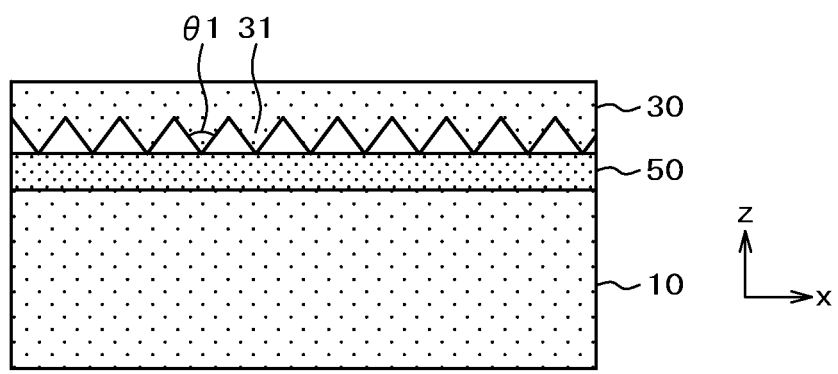
FIG. 10 is a cross-sectional view of the diffusion sheet disposed between the light guide plate and the prism sheet.

FIG. 10 illustrates a configuration for addressing the above problem. In the configuration depicted in FIG. 10, the diffusion sheet 50 is disposed on the light guide plate 10, and the prism sheet 30 is disposed on the diffusion sheet 50. Referring to FIG. 10, the prism array configuration of the prism sheet 30, such as the pitch and apex angle of the prisms 31, is the same as that of the prism sheet depicted in FIG. 8. It should be noted that the apex angle of the prisms in FIG. 8 is θ1. Further, the specifications for the diffusion sheet 50, such as thickness and haze value, are the same as those for the diffusion sheet depicted in FIG. 8. The thickness of the diffusion sheet is, for example, 0.1 mm.

FIG. 11 illustrates the light distribution angle property of the configuration depicted in FIG. 10. As depicted in FIG. 11, the configuration depicted in FIG. 10 makes the light distribution angle property in the y-direction extremely bad. Therefore, it is difficult to use the resulting light as collimated light. The reason is that the light emitted from the light guide plate 10 has a predetermined angle with respect to the normal direction of the main surface of the light guide plate 10, and that the specifications for the prism array formed on the prism sheet 30 are set to direct the emitted light in the normal direction of the prism sheet 30 at an appropriate distribution angle in a case where the prism sheet 30 is disposed directly on the upper surface of the light guide plate 10.

Stated differently, it is conceivable that when the diffusion sheet 50 is disposed between the light guide plate 10 and the prism sheet 30, the direction of the light emitted through the diffusion sheet 50 substantially changes to cause a mismatch, particularly in the y-direction, between the light from the light guide plate 10 and the prism array formed on the prism sheet. The inventors of the present invention have found that the mismatch can be resolved by changing the apex angle of the prisms 31 on the prism sheet 30.

Figure 12:
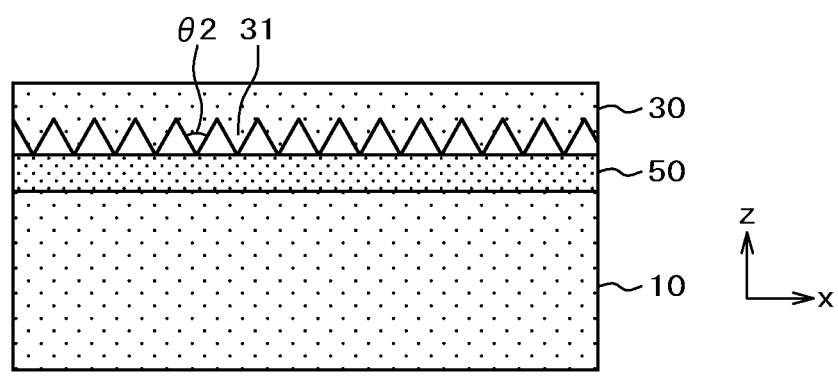
FIG. 12 is a cross-sectional view illustrating a configuration according to a first embodiment of the present invention.

FIG. 12 is a cross-sectional view illustrating a combination of the light guide plate 10, prism sheet 30, and diffusion sheet 50 that is provided by the present invention. The configuration depicted in FIG. 12 is such that the diffusion sheet 50 is disposed between the light guide plate 10 and the prism sheet 30, as is the case with the configuration depicted in FIG. 10. The configuration depicted in FIG. 12 differs from the configuration depicted in FIG. 10 in that the apex angle of the prisms on the prism sheet 30 is reduced. While the apex angel θ1 of the prisms depicted in FIG. 10 is 68 degrees, the apex angle θ2 of the prism sheet depicted in FIG. 12 is 56 degrees. The specifications for the light guide plate 10 and diffusion sheet 50 depicted in FIG. 12 are the same as those for the counterparts depicted in FIG. 10.

FIG. 13 illustrates the light distribution angle property of the configuration depicted in FIG. 12. As depicted in FIG. 13, the light distribution angle property is significantly improved. Particularly, the light distribution angle property in the y-direction is dramatically improved. The light distribution angle property depicted in FIG. 13 is close in value to the light distribution angle property depicted in FIG. 7, which illustrates a case where the diffusion sheet 50 is not used. That is to say, the full width at half maximum is 26 degrees in both the x- and y-directions, as is the case with the full width at half maximum depicted in FIG. 7. Meanwhile, the configuration depicted in FIG. 12 includes the diffusion sheet 50, and thus alleviates a problem caused, for example, by glary emitted light and bright lines in the vicinity of the light source. Further, even if a foreign substance exists, for example, on the light guide plate 10 or the prism sheet 30, the diffusion sheet 50 is able to exert its influence to alleviate the impact on the irradiation light.

Figure 14:
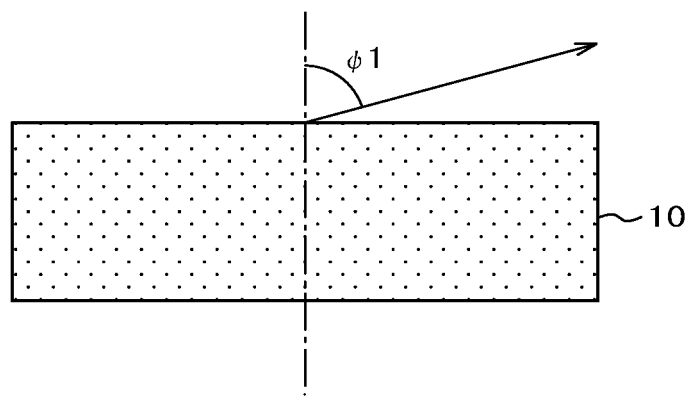
FIG. 14 is a cross-sectional view illustrating the direction of light emitted from the light guide plate.

FIGS. 14 to 17 are diagrams illustrating operations that are performed according to the first embodiment. FIG. 14 illustrates the direction of light emitted from the light guide plate 10. Referring to FIG. 14, the chief ray from the light guide plate 10, which is indicated by the arrow, is tilted by ψ1 with respect to the normal direction of the main surface of the light guide plate 10. However, the light emitted from the light guide plate 10 has a distribution.

Figure 15:
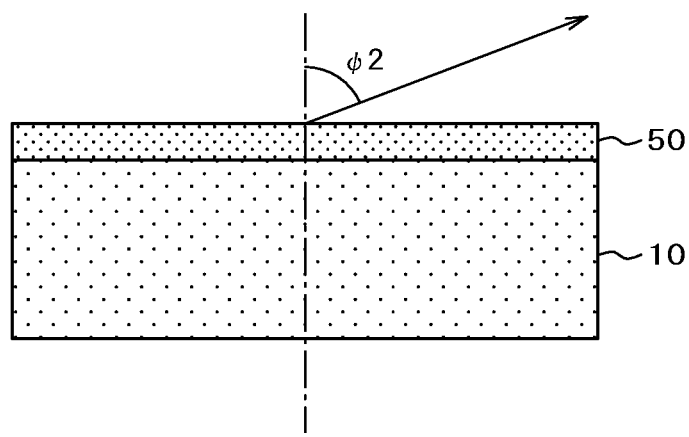
FIG. 15 is a cross-sectional view illustrating the direction of light emitted from the diffusion sheet according to the first embodiment.

FIG. 15 is a cross-sectional view illustrating a case where the diffusion sheet 50 is disposed on the light guide plate 10. The haze value of the diffusion sheet 50 depicted in FIG. 15 is relatively small, that is, 30%. The haze value (%) can be defined by diffusion transmittance/total light transmittance. However, the haze value may be measured in compliance with JIS K7361.

Allowing the emitted light to pass through the diffusion sheet 50 reduces the angle ϕ2 of the chief ray of the emitted light, which is indicated by the arrow, with respect to the normal direction of the light guide plate 10 or diffusion sheet 50. This angle change increases with an increase in the haze value of the diffusion sheet 50. Since the haze value of the diffusion sheet 50 depicted in FIG. 15 is small, the angle change (ψ1−ψ2) of the emitted light is relatively small.

FIG. 16 is a cross-sectional view illustrating a state where the prism sheet 30 is disposed on the diffusion sheet 50 depicted in FIG. 15. The apex angle θp1 of the prisms on the prism sheet 30 is selected to match the angle that is formed by the chief ray of the light emitted from the diffusion sheet 50, which is depicted in FIG. 15, with respect to the normal direction of the diffusion sheet 50. That is to say, the apex angle θp1 of the prisms 31 is set so that the light emitted from the prism sheet 30 is directed in the normal direction of the prism sheet 30 as depicted in FIG. 16.

FIG. 17 illustrates the light distribution angle property in a situation where the specifications depicted in FIG. 16 are complied with, that is, in a situation where the haze value of the diffusion sheet 50 is 30% and the apex angle of the prisms 31 on the prism sheet 30 is 66 degrees. As depicted in FIG. 17, the light distribution angle property is almost the same as that in a case where the diffusion sheet 50 does not exist. The full width at half maximum is 26 degrees, as is the case with the full width at half maximum depicted in FIG. 7. Although the diffusion sheet 50 is used as described above to alleviate the problem caused by glary light spots and bright lines and reduce the impact caused by a foreign substance, the light distribution angle property can be made equivalent to the case where the diffusion sheet 50 is not used.

Figure 18:
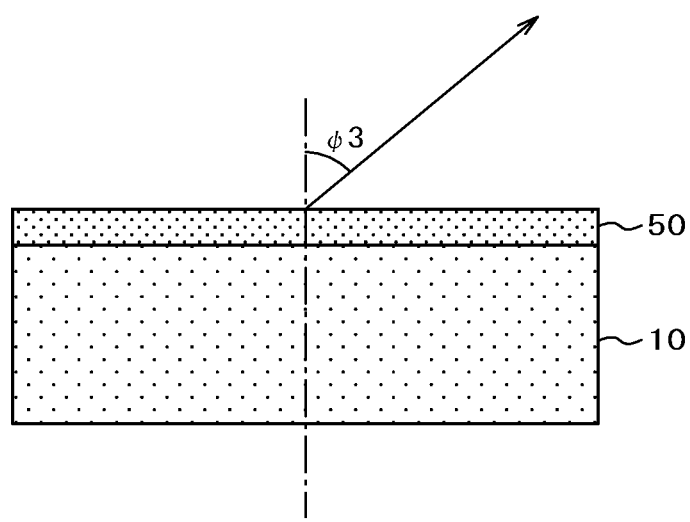
FIG. 18 is a cross-sectional view illustrating the direction of light emitted from the diffusion sheet according to a second embodiment of the present invention.
Figure 19:
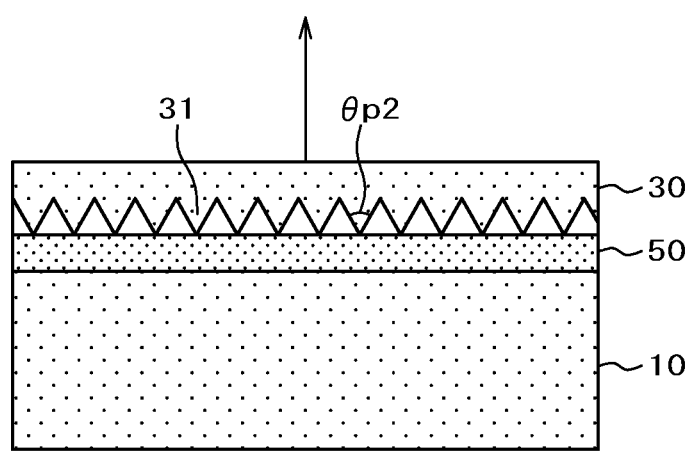
FIG. 19 is a cross-sectional view illustrating the direction of light emitted from the prism sheet according to the second embodiment.

FIGS. 14, 18, and 19 are diagrams illustrating a second embodiment of the present invention. FIG. 14 depicts the characteristics of the light guide plate 10, which are the same as those described in conjunction with the first embodiment. The configuration depicted in FIG. 18 is such that the haze value of the diffusion sheet 50 is different from FIG. 15 although the appearance is the same as that depicted in FIG. 15. The haze value of the diffusion sheet 50 depicted in FIG. 18 is 64% and greater than the haze value indicated in FIG. 15. In such a situation, the direction of the chief ray of the light emitted from the light guide plate 10 greatly varies with the diffusion sheet 30. The difference (ψ1−ψ3) between the direction ψ3 of the chief ray of the light emitted from the diffusion sheet 50 depicted in FIG. 18 and the direction ψ1 of the chief ray of the light emitted from the light guide plate 10 is greater than the difference (ψ1−ψ2) in the first embodiment. That is to say, the direction of the chief ray of the light emitted from the diffusion sheet 50 in the second embodiment is closer to the normal direction than in the first embodiment.

FIG. 19 is a cross-sectional view illustrating a state where the prism sheet 30 is added to the configuration depicted in FIG. 18. The apex angle θ2 of the prisms on the prism sheet 30 is selected to match the angle that is formed by the light emitted from the diffusion sheet 50, which is depicted in FIG. 18, with respect to the normal direction. That is to say, the apex angle of the prisms 31 is set so that the light emitted from the prism sheet 30 is directed in the normal direction of the prism sheet 30 as depicted in FIG. 19. The apex angle θp2 of the prisms 31 on the prism sheet 30 depicted in FIG. 19 is smaller than the apex angle θp1 of the prisms 31 on the prism sheet 30 depicted in FIG. 16. That is to say, the apex angle of the prisms 31 on the prism sheet 30 decreases with an increase in the haze value of the employed diffusion sheet 50.

Figure 20:
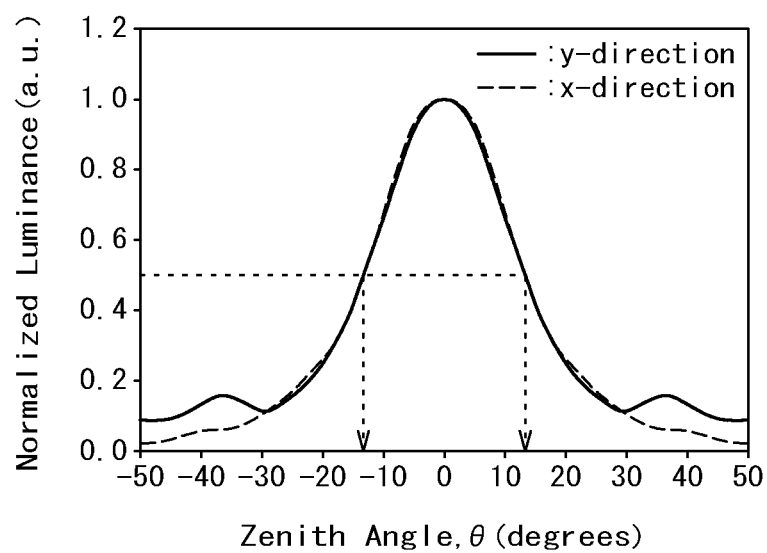
FIG. 20 is a graph illustrating an example of the light distribution angle property of a configuration depicted in FIG. 19.

FIG. 20 illustrates the light distribution angle property in a situation where the specifications depicted in FIG. 19 are complied with, that is, in a situation where the haze value of the diffusion sheet 50 is 64% and the apex angle of the prisms 31 on the prism sheet 30 is 56 degrees. As depicted in FIG. 20, the light distribution angle property is almost the same as the light distribution angle property in the case where the diffusion sheet 50 does not exist, which is depicted in FIG. 7. The full width at half maximum is 26 degrees, as is the case with the full width at half maximum depicted in FIG. 7. That is to say, even if the haze value of the diffusion sheet 50 is changed, the apex angle of the prisms 31 on the prism sheet 30 is properly set, and the diffusion sheet 50 is used to alleviate the problem caused by glary light spots and bright lines and reduce the impact caused by a foreign substance. Nevertheless, the light distribution angle property can be made equivalent to the case where the diffusion sheet 50 is not used.

Figure 21:
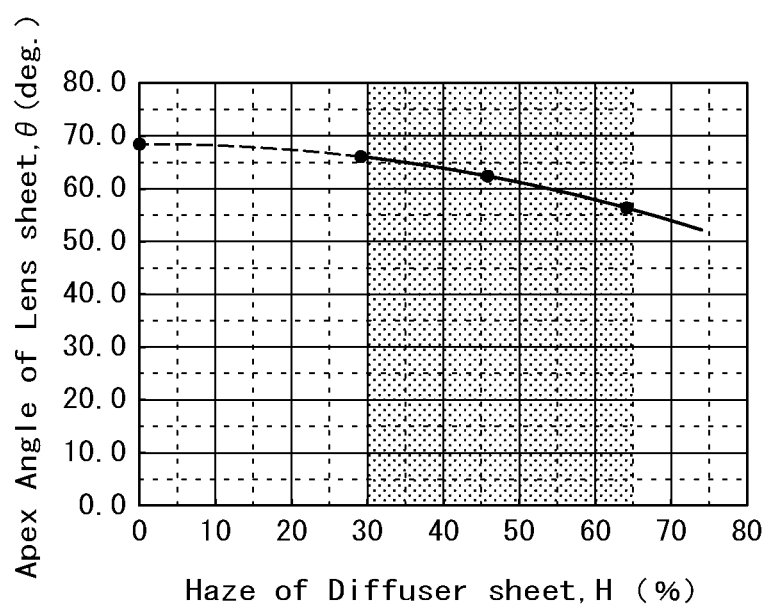
FIG. 21 is a graph illustrating the relationship between the haze value of the diffusion sheet and the apex angle of prisms on the prism sheet according to the present invention.

FIG. 21 is a diagram illustrating the optimal relationship between the haze value of the diffusion sheet 50 and the apex angle of the prisms 31 on the prism sheet 30 in the above-described configuration depicted in FIG. 16 or 19. Referring to FIG. 21, the horizontal axis represents the haze value of the diffusion sheet 50, and the vertical axis represents the apex angle of the prisms 31 on the prism sheet 30.

Referring to FIG. 21, if the haze value of the diffusion sheet 50 is smaller than 30%, it is not expected that the diffusion sheet 50 will be sufficiently effective for alleviating the problem caused, for example, by glary light spots, bright lines, and foreign substances. Therefore, it is desirable that the haze value of the diffusion sheet 50 be 30% or greater. Meanwhile, if the haze value of the diffusion sheet 50 is greater than 65%, the light distribution angle will not easily be controlled by merely changing the apex angle of the prisms 31 on the prism sheet 30. Accordingly, the haze value of the diffusion sheet 50 should be within a range of 30% to 65%. When the haze value of the diffusion sheet 50 is within this range, the corresponding apex angle of the prisms 31 on the prism sheet 30 is within a range of 66 degrees to 55 degrees.

A more preferable range of the haze value of the diffusion sheet 50 for ensuring both the uniformity of light distribution angle property and the uniformity of emitted light is from 30% to 55%. In this case, the apex angle of the prisms 31 on the prism sheet 30 is within a range of 66 degrees to 59 degrees. An even more preferable range of the haze value of the diffusion sheet 50 is from 35% to 50%. In this case, the apex angle of the prisms 31 on the prism sheet 30 is within a range of 64 degrees to 60 degrees.

Figure 22:
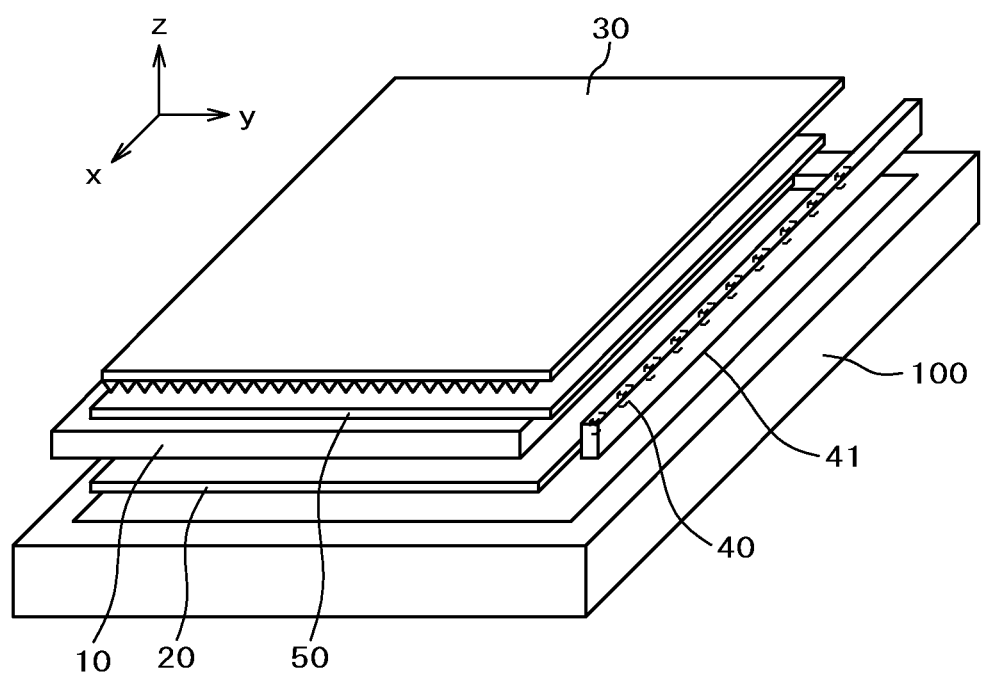
FIG. 22 is an exploded perspective view of the lighting device according to the first embodiment.

FIG. 22 is an exploded perspective view of the lighting device according to the first embodiment, which corresponds to the depiction in FIG. 16 or 19. FIG. 22 differs from FIG. 1 in that the diffusion sheet 50 is disposed between the light guide plate 10 and the prism sheet 30. Referring to FIG. 22, the relationship between the haze value of the diffusion sheet 50 and the apex angle of the prisms 31 on the prism sheet 30 is as described with reference to FIG. 21. The other component elements depicted in FIG. 22 are the same as those described with reference to FIG. 1.

Second Embodiment

Figure 23:
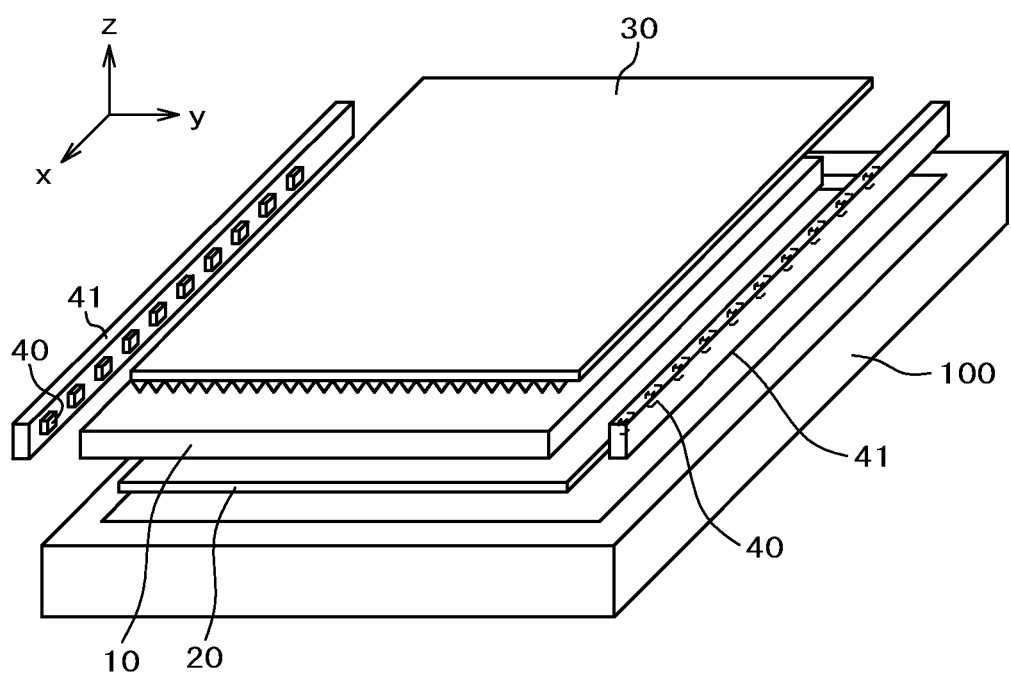
FIG. 23 is an exploded perspective view of the lighting device according to a second comparative example.

As depicted in FIG. 22, the first embodiment is configured such that the LEDs 40 are disposed on only one side of the light guide plate 10. The present invention is also applicable to a case where the LEDs 40 are disposed on two sides of the light guide plate 10. FIG. 23 is an exploded perspective view of a thin lighting device according to a second comparative example. The thin lighting device depicted in FIG. 23 is characterized in that the LEDs 40 are disposed along two sides of the light guide plate 10. The other component elements are the same as those described with reference to FIG. 1.

Figure 24:
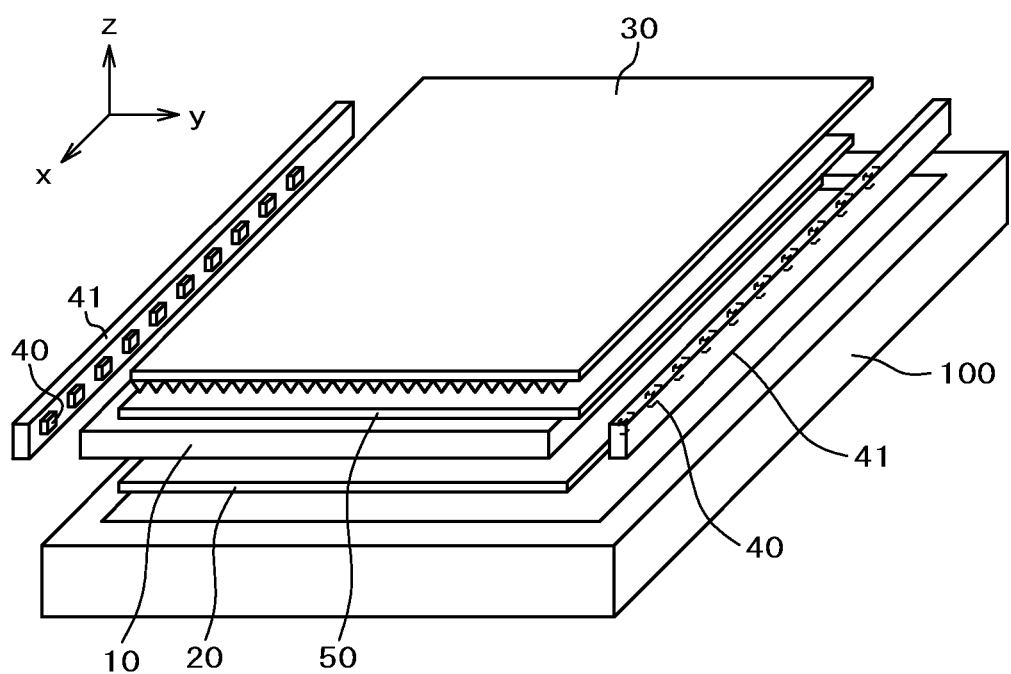
FIG. 24 is an exploded perspective view of the lighting device according to the second embodiment.

FIG. 24 is an exploded perspective view of the lighting device according to the second embodiment. FIG. 24 differs from FIG. 23 in that the diffusion sheet 50 is disposed between the light guide plate 10 and the prism sheet 30. The haze value of the diffusion sheet 50 and the apex angle of the prisms 31 on the prism sheet 30 are in the same relationship as described with reference to FIG. 21, which depicts the first embodiment.

Figure 25:
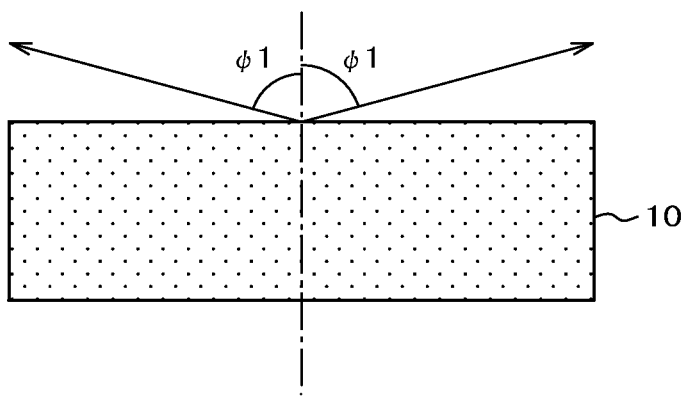
FIG. 25 is a cross-sectional view illustrating the light emitted from the light guide plate according to the second embodiment.

The arrows in FIG. 25 indicate the directions of the chief ray of the light emitted from the light guide plate 10 in a case where the LEDs 40 are disposed on two sides of the light guide plate 10. In contrast to FIG. 14, which depicts the first embodiment, FIG. 25 indicates that the emitted light exists in two directions, namely, leftward and rightward. The angle ψ1 formed by the emitted light with respect to the normal of the light guide plate 10 is the same as that depicted in FIG. 14.

Figure 26:
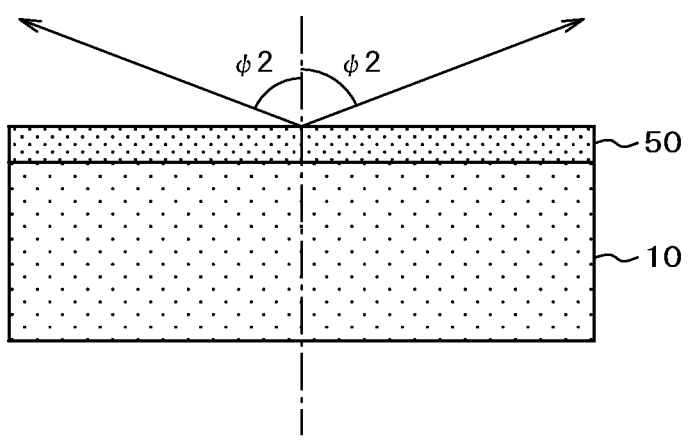
FIG. 26 is a cross-sectional view illustrating the light emitted from the diffusion sheet according to a first example of the second embodiment.

FIG. 26 illustrates a case where the diffusion sheet 50 having a haze value of 29% is disposed on the light guide plate 10. Due to the disposed diffusion sheet 50, the direction of the chief ray of emitted light with respect to the normal direction of the main surface of the diffusion sheet 50 is at an angle of ψ2. This angle is the same as the angle ψ2 depicted in FIG. 15. FIG. 26 differs from FIG. 15 in that the emitted light exists in two directions, namely, leftward and rightward.

When the prism sheet 30 with the prisms 31 having an apex angle of θ1 (e.g., 66 degrees) is disposed on the diffusion sheet 50 included in the configuration depicted in FIG. 26, the chief ray is emitted from the prism sheet 30 in the normal direction with respect to the main surface of the prism sheet 30 as depicted in FIG. 16. The reason is that, stated differently, the same action is performed on the light emitted in any direction depicted in FIG. 26 since the prisms 31 on the prism sheet 30 depicted in FIG. 16 are left-right symmetrical.

Figure 27:
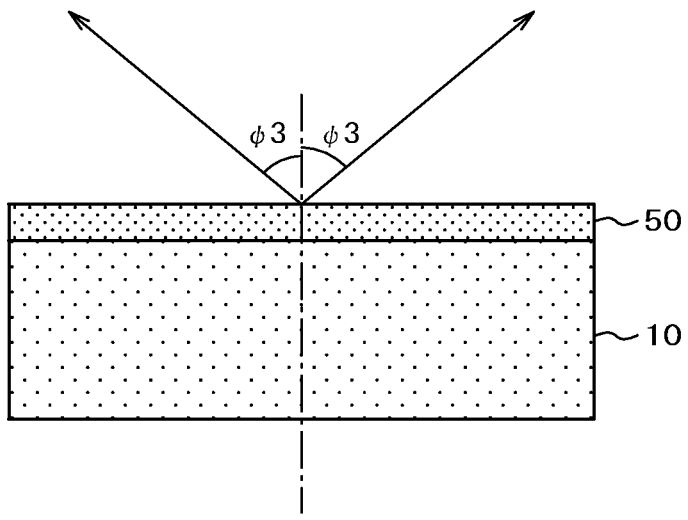
FIG. 27 is a cross-sectional view illustrating the light emitted from the diffusion sheet according to a second example of the second embodiment.

FIG. 27 illustrates a case where the diffusion sheet 50 having a haze value of 64% is disposed on the light guide plate 10. Due to the disposed diffusion sheet 50, the direction of the chief ray of emitted light with respect to the normal direction of the main surface of the diffusion sheet 50 is at an angle of ψ3. This angle is the same as the angle ψ3 depicted in FIG. 18, which depicts the first embodiment. FIG. 27 differs from FIG. 18 in that the emitted light exists in two directions, namely, leftward and rightward.

When the prism sheet 30 with the prisms 31 having an apex angle of θ2 (e.g., 56 degrees) is disposed in the configuration depicted in FIG. 27, the chief ray is emitted from the prism sheet 30 in the normal direction with respect to the main surface of the prism sheet 30 as depicted in FIG. 19. The reason is that, stated differently, the same action is performed on the light emitted in any direction depicted in FIG. 27 since the prisms 31 on the prism sheet 30 depicted in FIG. 19 are left-right symmetrical.

As described above, the present invention is also applicable to a case where the LEDs 40 acting as the light source are disposed on both sides of the light guide plate 10, as is the case with the first embodiment.

The foregoing description assumes that the prism array on the prism sheet 30 is extended in the direction of one side of the light guide plate 10, that is, the x-direction depicted, for example, in FIG. 22 or 24. In some cases, however, in order to avoid moire, the direction in which the prism array is extended needs to be at a predetermined angle with respect to the direction of one side of the light guide plate 10. The present invention is also applicable to such a configuration for avoiding moire at an angle of 5 degrees or smaller, which does not significantly degrade the light distribution angle property.

What is claimed is:

1. A lighting device comprising:
a light guide plate;
a plurality of light emitting diodes;
a prism sheet that is disposed on a side toward an upper surface of the light guide plate; and
a reflective sheet that is disposed on a side toward a lower surface of the light guide plate, wherein
the plurality of light emitting diodes are arrayed on a side surface corresponding to a first side of the light guide plate in a first direction along the first side,
the prism sheet includes a first prism array that is formed on a surface facing the light guide plate,
the first prism array includes prisms that are extended in the first direction and arrayed in a second direction perpendicular to the first direction,
the upper surface of the light guide plate and the prism sheet sandwich a diffusion sheet therebetween,
the diffusion sheet has a haze value between 30% and 65% when measured in compliance with JIS K7361,
the prisms on the first prism array have an apex angle between 55 degrees and 66 degrees,
a second prism array that is formed on the upper surface of the light guide plate, extended in the second direction, and arrayed in the first direction; and
a third prism array that is formed on the lower surface of the light guide plate, extended in the first direction, and arrayed in the second direction, wherein
a pitch of the prisms formed on the first prism array is greater than a pitch of prisms formed on the second prism array and a pitch of prisms formed on the third prism array.

2. The lighting device according to claim 1, wherein
the haze value of the diffusion sheet is between 30% and 55% when measured in compliance with JIS K7361, and
the apex angle of the prisms on the first prism array is between 59 degrees and 66 degrees.

3. The lighting device according to claim 1, wherein
the haze value of the diffusion sheet is between 35% and 55% when measured in compliance with JIS K7361, and
the apex angle of the prisms on the first prism array is between 60 degrees and 64 degrees.

4. The lighting device according to claim 1, wherein
a direction of a chief ray of light emitted from the upper surface of the light guide plate is tilted with respect to a normal of the upper surface of the light guide plate.

5. The lighting device according to claim 4, wherein
an angle between a direction of a chief ray of light emitted from the prism sheet and a normal direction of the prism sheet is smaller than the angle between the direction of the chief ray of light emitted from the upper surface of the light guide plate and the normal of the upper surface of the light guide plate.

6. The lighting device according to claim 4, wherein
a direction of a chief ray of light emitted from the prism sheet is a same as a normal direction of the prism sheet.

7. A lighting device comprising:
a light guide plate;
a plurality of light emitting diodes;
a prism sheet that is disposed on a side toward an upper surface of the light guide plate; and
a reflective sheet that is disposed on a side toward a lower surface of the light guide plate, wherein
the plurality of light emitting diodes are arrayed on a side surface corresponding to a first side of the light guide plate in a first direction along the first side,
the prism sheet includes a first prism array that is formed on a surface facing the light guide plate,
the first prism array includes prisms that are extended in the first direction and arrayed in a second direction perpendicular to the first direction,
the upper surface of the light guide plate and the prism sheet sandwich a diffusion sheet therebetween,
the diffusion sheet has a haze value between 30% and 65% when measured in compliance with JIS K7361,
the prisms on the first prism array have an apex angle between 55 degrees and 66 degrees,
a second prism array is formed on the upper surface of the light guide plate, the second prism array is extended in the second direction, and arrayed in the first direction,
a third prism array is formed on the lower surface of the light guide plate, the third prism array is extended in the first direction, and arrayed in the second direction, and
the apex angle of the prisms formed on the first prism array is smaller than an apex angle of prisms formed on the second prism array and an apex angle of prisms formed on the third prism array.

8. The lighting device according to claim 7, wherein
a direction of a chief ray of light emitted from the upper surface of the light guide plate is tilted with respect to a normal of the upper surface of the light guide plate.

9. The lighting device according to claim 7, wherein
an angle between a direction of a chief ray of light emitted from the prism sheet and a normal direction of the prism sheet is smaller than the angle between the direction of the chief ray of light emitted from the upper surface of the light guide plate and the normal of the upper surface of the light guide plate.

10. The lighting device according to claim 7, wherein
a direction of a chief ray of light emitted from the prism sheet is a same as a normal direction of the prism sheet.

11. A lighting device comprising
a light guide plate;
a plurality of light emitting diodes;
a prism sheet that is disposed on a side toward an upper surface of the light guide plate; and
a reflective sheet that is disposed on a side toward a lower surface of the light guide plate, wherein
the plurality of light emitting diodes are arrayed on a side surface corresponding to a first side of the light guide plate in a first direction along the first side,
the prism sheet includes a first prism array that is formed on a surface facing the light guide plate, the first prism array includes prisms that are extended in the first direction and arrayed in a second direction perpendicular to the first direction, the upper surface of the light guide plate and the prism sheet sandwich a diffusion sheet therebetween, the diffusion sheet has a haze value between 30% and 65% when measured in compliance with JIS K7361, the prisms on the first prism array have an apex angle between 55 degrees and 66 degrees, a second prism array is formed on the upper surface of the light guide plate, the second prism array is extended in the second direction, and arrayed in the first direction; and a third prism array is formed on the lower surface of the light guide plate, the third prism array is extended in the first direction, and arrayed in the second direction, and a height of the prisms formed on the first prism array is greater than a height of prisms formed on the second prism array and a height of prisms formed on the third prism array.

12. The lighting device according to claim 11, wherein a direction of a chief ray of light emitted from the upper surface of the light guide plate is tilted with respect to a normal of the upper surface of the light guide plate.

13. The lighting device according to claim 11, wherein an angle between a direction of a chief ray of light emitted from the prism sheet and a normal direction of the prism sheet is smaller than the angle between the direction of the chief ray of light emitted from the upper surface of the light guide plate and the normal of the upper surface of the light guide plate.

14. The lighting device according to claim 11, wherein a direction of a chief ray of light emitted from the prism sheet is a same as a normal direction of the prism sheet.

\* \* \* \* \*